US010829018B2

United States Patent
Burton et al.

(10) Patent No.: US 10,829,018 B2
(45) Date of Patent: Nov. 10, 2020

(54) ARMREST FOR VEHICLE SEAT AND VEHICLE SEAT

(71) Applicants: Adient Luxembourg Holding S.á r.l., Luxembourg (LU); Eric Michalak, Northville, MI (US)

(72) Inventors: Brent Burton, Windsor (CA); Eric Michalak, Northville, MI (US); Nathan Caruss, Ann Arbor, MI (US); Mark Shafer, Grosse Pointe Woods, MI (US); Michael J. Kapusky, Milan, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 64 days.

(21) Appl. No.: 16/096,143

(22) PCT Filed: Apr. 24, 2017

(86) PCT No.: PCT/US2017/029073
§ 371 (c)(1),
(2) Date: Oct. 24, 2018

(87) PCT Pub. No.: WO2017/189404
PCT Pub. Date: Nov. 2, 2017

(65) Prior Publication Data
US 2019/0135151 A1 May 9, 2019

Related U.S. Application Data

(60) Provisional application No. 62/329,551, filed on Apr. 29, 2016.

(51) Int. Cl.
*B60N 2/75* (2018.01)
*B60N 2/02* (2006.01)
*B60N 2/22* (2006.01)

(52) U.S. Cl.
CPC ........... *B60N 2/767* (2018.02); *B60N 2/0232* (2013.01); *B60N 2/2209* (2013.01); *B60N 2/753* (2018.02)

(58) Field of Classification Search
CPC ....... B60N 2/767; B60N 2/753; B60N 2/2209
See application file for complete search history.

(56) References Cited

U.S. PATENT DOCUMENTS 4,466,664 A * 8/1984 Kondou ................. B60N 2/767
297/411.39
4,887,866 A 12/1989 Rusin
(Continued)

FOREIGN PATENT DOCUMENTS

CN 101565008 A 10/2009
CN 202764753 U 3/2013
(Continued)

OTHER PUBLICATIONS

Chinese Patent and Trademark Office, Office Action in Application No. CN2017800264232, dated Aug. 31, 2020, 8 pages.

*Primary Examiner* — David R Dunn
*Assistant Examiner* — Tania Abraham
(74) *Attorney, Agent, or Firm* — Marshall & Melhorn, LLC

(57) ABSTRACT

A vehicle seat (10, 100, 200, 300, 400) includes a seat base (14,114, 214, 314, 414) a backrest (12, 112, 212, 312, 412) with a seat base and backrest pivot connection between the seat base and the backrest. An armrest (16, 216, 216, 316, 416) is connected to the vehicle seat at an armrest to vehicle seat support connection (20,120, 220, 320, 420). An armrest linkage system changes an inclination of the armrest relative to the backrest upon changes in inclination of the backrest relative to the seat base, over a pivot range of motion of the backrest relative to the seat base. This may maintain the inclination of the armrest relative to the seat base and the
(Continued)

seat floor or may change the inclination of the armrest relative to the seat base and the seat floor.

11 Claims, 13 Drawing Sheets

(56) References Cited

U.S. PATENT DOCUMENTS

| | | | | |
|---|---|---|---|---|
| 4,968,095 | A | * | 11/1990 | Moyer ................ B60N 2/767 |
| | | | | 297/411.39 |
| 4,978,170 | A | | 12/1990 | Pelz et al. |
| 6,361,114 | B1 | * | 3/2002 | Rumler ................ A47C 7/543 |
| | | | | 297/411.39 |
| 7,159,937 | B2 | | 1/2007 | Williamson et al. |
| 7,229,118 | B2 | * | 6/2007 | Saberan ............... B60N 2/0224 |
| | | | | 296/65.01 |
| 8,662,561 | B2 | | 3/2014 | Runde et al. |
| 8,733,840 | B2 | * | 5/2014 | Westerink ............ B60N 2/1625 |
| | | | | 297/316 |
| 8,950,816 | B2 | | 2/2015 | Ott et al. |
| 9,108,549 | B2 | * | 8/2015 | Thurow .................... B60N 2/22 |
| 9,156,385 | B1 | | 10/2015 | Lewis |
| 2010/0109387 | A1 | * | 5/2010 | Merensky ............. A47C 7/503 |
| | | | | 297/75 |
| 2015/0036060 | A1 | * | 2/2015 | Yaghoubi ................ B60N 2/01 |
| | | | | 348/837 |
| 2015/0108813 | A1 | * | 4/2015 | Muller ................ B60N 2/2209 |
| | | | | 297/362.11 |

FOREIGN PATENT DOCUMENTS

| | | |
|---|---|---|
| CN | 202806446 U | 3/2013 |
| CN | 105216704 A | 1/2016 |
| EP | 1580065 A2 | 9/2005 |
| KR | 100311541 B1 | 10/2001 |
| KR | 20100066722 A | 6/2010 |
| KR | 101423774 B1 | 7/2014 |

* cited by examiner

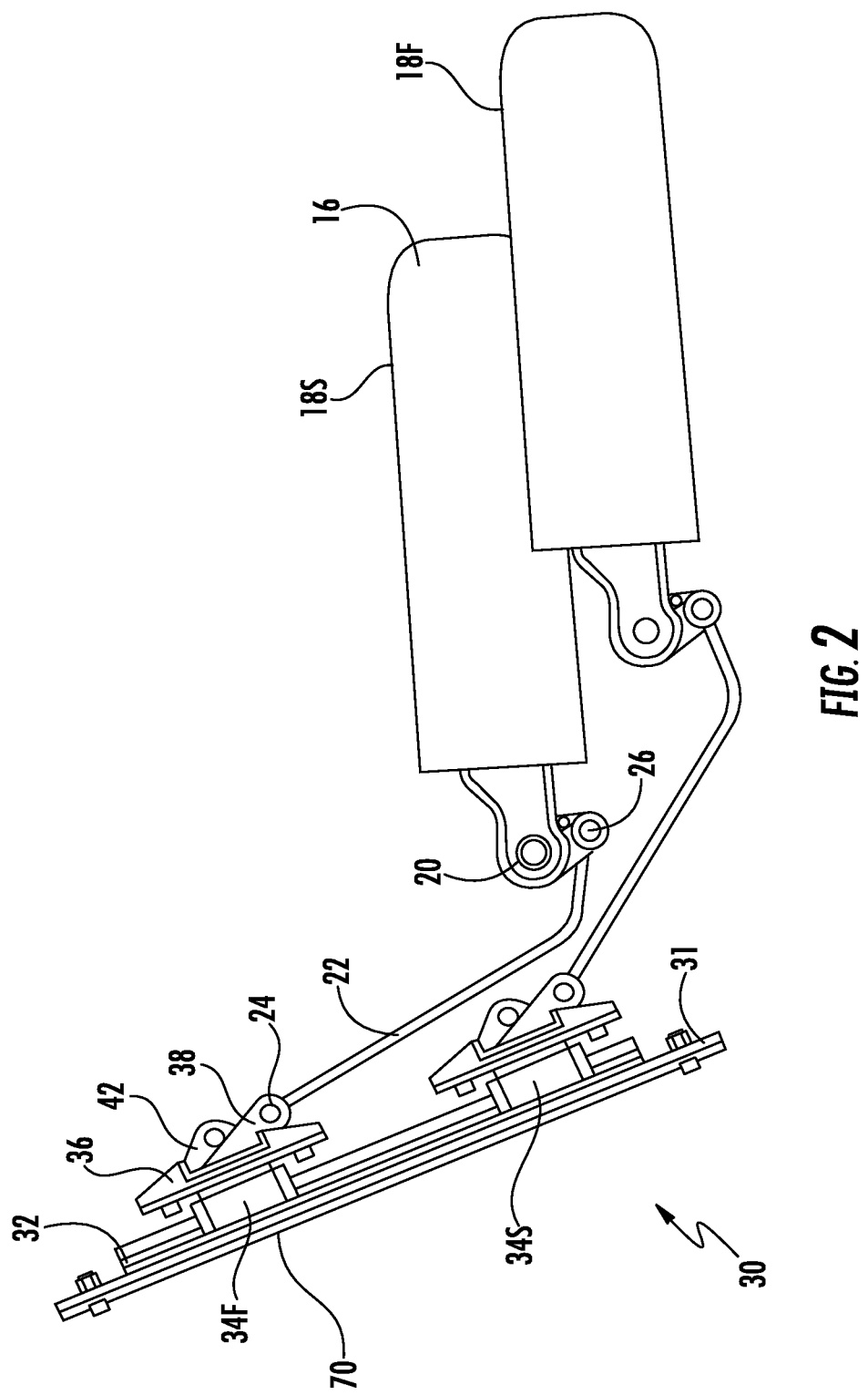

ARMREST FOR VEHICLE SEAT AND VEHICLE SEAT

CROSS REFERENCE TO RELATED APPLICATIONS

This application claims the benefit of priority of U.S. provisional application 62/329,551, filed Apr. 29, 2016, the entire contents of which are incorporated herein by reference.

FIELD OF THE INVENTION

The present invention relates vehicle seats in general and more particularly relates to vehicle seats with a backrest that is movable between an upright position and a fully reclined position.

BACKGROUND OF THE INVENTION

Vehicle seats can be provided with a backrest that moves relative to the seat base (also known as the seat cushion). This movement may be between a backrest upright (full up) position and a backrest fully reclined position. The backrest may also be movable between a full forward position and a fully reclined position (a full 180° of movement or more). The backrest may also have a mechanism and features for movement between an upright and a fully reclined position (a reclining feature) and may also have an easy entry feature—which typically combines forward movement of the backrest with forward movement of the seat base. Seats with a vehicle structure (partition) directly behind them do not recline. However, so-called slouch seats may be provided at such locations. A tilting of the backrest (from an upright position to a fully reclined position) may be accomplished with a forward movement of the seat base. Although such slouch seats may be usefully deployed with a vehicle partition directly behind the seat, slouch seats may be advantageously used even where there is ample space behind the vehicle seat, for the backrest to recline. Such slouch seats (backrest with seat base) may be carried by seat frames that may be moveable forward and backward along rails fixed to the vehicle floor.

Automotive vehicle seats may be provided with an armrest. The armrest may be fixed to the backrest of or to the vehicle structure or to some other structural part of the vehicle seat, such as to the seat base or a seat frame. Some armrests for automotive vehicle seats are part of the backrest and may be moved between a stored/full up position, in which the armrest forms a part of the backrest, and a deployed/comfort position. A reclining of the backrest with movement between a full up position and a fully reclined position will change the angle of the arm rest relative to the vehicle floor and relative to the seat base.

SUMMARY OF THE INVENTION

It is an object of the invention to provide a vehicle seat with a seat base and a backrest that can recline relative to the seat base and with an armrest connected to the vehicle seat wherein the armrest may maintain the inclination of the armrest relative to the seat base and the seat floor or change in inclination relative to the backrest and/or change in inclination relative to the seat base and the seat floor, which changes do not match the changes in inclination of the backrest.

According to the invention, a vehicle seat is provided that includes a seat base, a backrest, and a seat base backrest pivot connection between the seat base and the backrest. An armrest is connected to the vehicle seat by an armrest to vehicle seat support connection. An armrest linkage (an armrest and backrest angular position/inclination angle coordinating system) changes an inclination of the armrest relative to the backrest upon changes in inclination of the backrest relative to the seat base (or vehicle floor), over a pivot range of motion of the backrest relative to the seat base (or vehicle floor).

The armrest to vehicle seat support connection may comprise an armrest to backrest pivot connection provided between the armrest and the backrest to pivotably connect the armrest to the backrest. In this case, although the inclination of the armrest relative to the backrest changes with changes in inclination of the backrest relative to the seat base, the armrest backrest pivot connection follows the travel path of the backrest, such that the armrest pivot moves with the backrest. The armrest to vehicle seat support connection may comprise an armrest to seat base connection provided between the armrest and the seat base or between the armrest the frame of the seat base or to some other vehicle seat frame. In this case, although the inclination of the armrest relative to the backrest changes with changes in inclination of the backrest relative to the seat base, the armrest need not follow the travel path of the backrest.

The pivot connection between the seat base and the backrest may form a slouch seat wherein the seat base moves forward from a seat full up position to a fully reclined position as the base backrest pivot connection moves forward from the seat full up position to the fully reclined position and as the backrest changes inclination relative to the seat base from a backrest full up position to a backrest fully reclined position. A backrest slouch guide rail arrangement may be provided comprising a rail part and a slider connected to the rail to slide along the rail, the slider being pivotably connected to the backrest at a backrest slider pivot connection. The armrest linkage comprises a link pivotably connected to the slider at a link to slider pivot connection and pivotably connected to the armrest at a link to armrest pivot connection. The link, from the link to slider pivot connection to the link to armrest pivot connection, the backrest, from the backrest to slider pivot connection to the backrest to armrest pivot connection, the slider, from the backrest to slider pivot connection to the link to slider pivot connection and the armrest from the link to armrest pivot connection to the link to armrest pivot connection may form a four bar linkage changing an inclination of the armrest relative to the backrest upon changes in inclination of the backrest relative to the seat base (or vehicle floor).

Instead of a slouch seat, the vehicle seat may have a fitting at a base of the backrest, providing a pivot connection between the seat base and the backrest. The fitting allows a pivoting of the backrest relative to the seat base to change the backrest in inclination relative to the seat base from a backrest full up position to a backrest fully reclined position. The armrest linkage may comprise a link pivotably connected to the seat base at a link to seat base pivot connection and pivotably connected to the armrest at a link to armrest pivot connection. The link, from the link to seat base pivot connection to the link to armrest pivot connection, the backrest, from the backrest to seat base pivot connection to the backrest to armrest pivot connection, the seat base, from the backrest to seat base pivot connection to the link to seat base pivot connection and the armrest from the link to armrest pivot connection to the link to armrest pivot connection may form a four bar linkage changing an inclination of the armrest relative to the backrest upon changes in inclination of the backrest relative to the seat base. The link may be disposed rearward of the backrest to seat base pivot connection and rearward of the backrest to armrest pivot connection. The link may be disposed forward of the backrest to seat base pivot connection and forward of the backrest to armrest pivot connection.

The armrest linkage system (an armrest and backrest angular position/inclination angle coordinating system) may comprise one or more links. The one or more links and the pivot points may be selected to provide various different angle relationships between the angle of the backrest and the angle of the armrest.

The armrest linkage system (an armrest and backrest angular position/inclination angle coordinating system) may comprise a transmission chain or cable connecting a rotatable driven part of the fitting to a rotatable driven part connected to the armrest for changing an inclination of the armrest relative to the backrest upon changes in inclination of the backrest relative to the seat base.

The armrest linkage system (an armrest and backrest angular position/inclination angle coordinating system) may comprise a backrest inclination motor, connected to a rotatable driven part of the fitting, an armrest inclination motor, connected to a rotatable driven part connected to the armrest, and a drive control controlling each of the backrest inclination motor and the armrest inclination motor for changing an inclination of the armrest relative to the backrest upon changes in inclination of the backrest relative to the seat base (or vehicle floor).

The armrest linkage system (an armrest and backrest angular position/inclination angle coordinating system) may comprise one or more links, pins, slots and motors. The one or more links and the pivot points may be selected to provide various different angle relationships between the angle of the backrest and the angle of the armrest. The armrest may remain at a set angle and hold this angle as the seat reclines. The armrest may be set at a relative comfort position/angle and maintain this angle as the seat reclines. The armrest may have a particular inclination for each inclination of the backrest. For example as the backrest changes in angle from between a full up position of +20 (relative to vertical) to +60 (relative to vertical) the armrest changes from −2 (relative to horizontal)—wrists slightly below elbows—to +6 (relative to horizontal). The range of recline of the backrest may be varied and the range of inclination change of the armrest may be varied. The relationship between the backrest recline and the armrest inclination may be changed and set in memory (passenger defined relationship between the backrest recline and the armrest inclination). Further, the variations may be selected by the user (passenger).

The armrest is attached to the backrest frame or to the seat base at the required comfort and safety locations. With a configured linkage, electric motors, clutches, pistons (pneumatic, hydraulic) or linear motion system an armrest linkage system according to the invention may be provided that changes an inclination of the armrest relative to the backrest upon changes in inclination of the backrest relative to the seat base, over a pivot range of motion of the backrest relative to the seat base. During this motion of the backrest and the seat base, the armrest linkage system controls an inclination of the armrest such that it is either unchanged or changes the inclination angle in a different manner or to a different degree as compared to the change in inclination angle of the backrest.

The armrest linkage system may connect a back slide rail to the armrest such that the armrest moves in unison with the slouch mechanism to maintain a horizontal position throughout the entire range of slouch motion. The armrest linkage system preferably allows for ingress/egress into the vehicle by putting the armrest in a stored—full up position. This allows the occupant to also store the armrest if desired. This may include a configured position, in the seat back, that places the armrest into a stored location. This allows the occupant to move in and out of the vehicle without the armrest interfering with this process. The armrest linkage system preferably allows for the armrest to be deployed from the stowed (ingress/egress) position to a designed comfort position. The armrest maintains this relative comfort backrest angle to armrest angle ratio though the full range of recliner slouch adjustment or other relationship based on a detailed comfort analysis. Through detailed ID DOV comfort analysis when the armrest is brought from a stored locked location in the seatback to a designed comfort position (usable location), the armrest maintains a comfort position throughout the range of seatback/recline travel. The design allows the armrest to maintain the cushion to armrest angle no matter what the seatback angle is. A friction snap may be provide to allow the armrest to be placed in a stowed (non-usable position). The designed snap locking feature may be provided in the seat back. This feature receives the armrest and locks the armrest in place, and out of the occupant's way, when not in use. This snap locking feature also holds the armrest in the stored position during a dynamic event to prevent the armrest opening and injuring the occupant.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a side view of a portion of the vehicle seat of the type of FIGS. 1A and 1B—with slouch movement—showing the armrest both in a full up position and in a full slouch position;

DESCRIPTION OF THE PREFERRED EMBODIMENTS

Figure 1A:
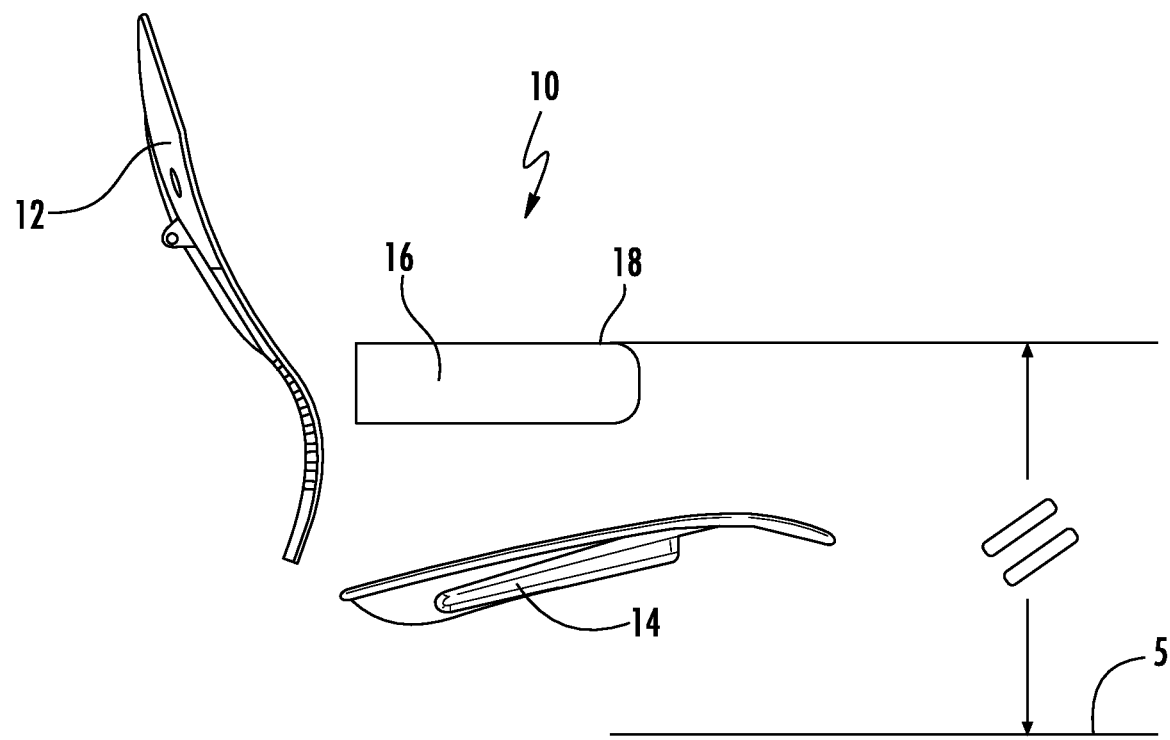
FIG. 1A is a schematic side view showing a vehicle seat in a full up position.
Figure 1B:
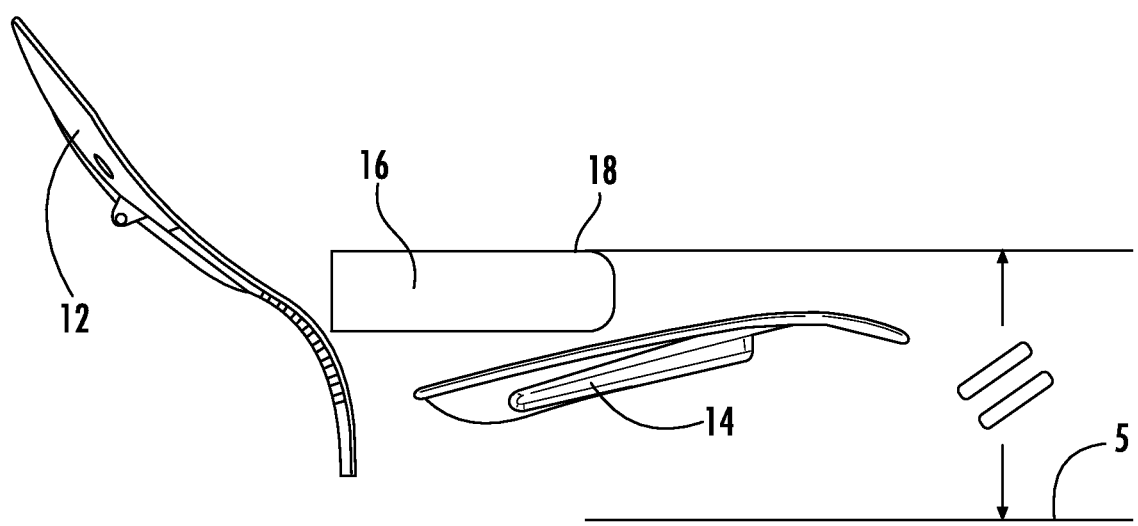
FIG. 1B is a schematic side view showing the vehicle seat of FIG. 1A in a fully reclined position.

Referring to the drawings, FIG. 1A schematically shows a vehicle seat 10 according to the invention. The seat comprises a backrest 12, a seat base (cushion) 14 and an armrest 16. The vehicle seat 10 is a slouch seat in which the inclination of the backrest 12 changes as the lower portion of backrest 12 and the seat base 14 slide forward (such as in the x-direction or travel direction of the vehicle). The vehicle seat 10 is moveable between the position shown in FIG. 1A, with the backrest 12, the seat base 14 and the armrest 16 in the full up position to the position shown in FIG. 1B, with the backrest 12, the seat base 14 and the armrest 16 in the full slouch position. According to the invention, the angle of the armrest 16 may be independent of the position changes and inclination changes of the backrest 12 and may also be independent of any position change of the seat base 14. As shown in FIGS. 1A and 1B the angle of the armrest 16 changes relative to the backrest 12 but remains essentially horizontal and parallel to the vehicle floor surface 5 as the inclination of the backrest 12 changes. The angle of the armrest 16 may also change relative to the backrest 12 and change relative to the vehicle floor surface 5 as the inclination of the backrest 12 changes.

FIG. 2 shows particulars of a backrest, slouch guide rail, slide arrangement 30 of an embodiment of the vehicle seat 10 according to the invention. The slide arrangement 30 supports the movement of the backrest 12 over the range of movement between the full up position (FIG. 1A) and the full slouch position (FIG. 1B). The slide arrangement 30 has a base 31 that is fixed to the vehicle structure or fixed to a seat frame 70 and that supports the moveable backrest 12 and the moveable seat base 14. Such a seat frame 70 may itself be moveable relative to the vehicle (such as in the x-direction or travel direction of the vehicle). With the movement from the full up position to the full slouch position, the backrest 12 and the seat base 14 move relative to the vehicle structure (bulkhead/wall) or relative to the seat frame/backrest frame 70. During this motion of the backrest 12 and the seat base 14, the inclination of the armrest 16 either is unchanged or changes inclination angle in a different manner or to a different degree as compared to the change in inclination angle of the backrest 12. In FIG. 2, the angle of inclination of upper surface 18F of the armrest 16, in the full up position, is essentially the same as the angle of inclination of the upper surface 18S, in the full slouch position. In each case the upper surface 18F, 18S is approximately horizontal and parallel to a vehicle floor surface.

The armrest 16 has a link/armrest pivot connection 26 that is spaced a distance from an armrest/backrest pivot connection 20. A transmission link 22 is pivotably connected to the link/armrest pivot connection 26 and extends to a link/slide pivot connection 24. The link/slide pivot connection 24 is fixed on a slide support 36 that is fixedly mounted on a slider 34. The slider 34 is slidingly movable along guide rail 32, between the full up position 34F and the full slouch position 34S.

Figure 3A:
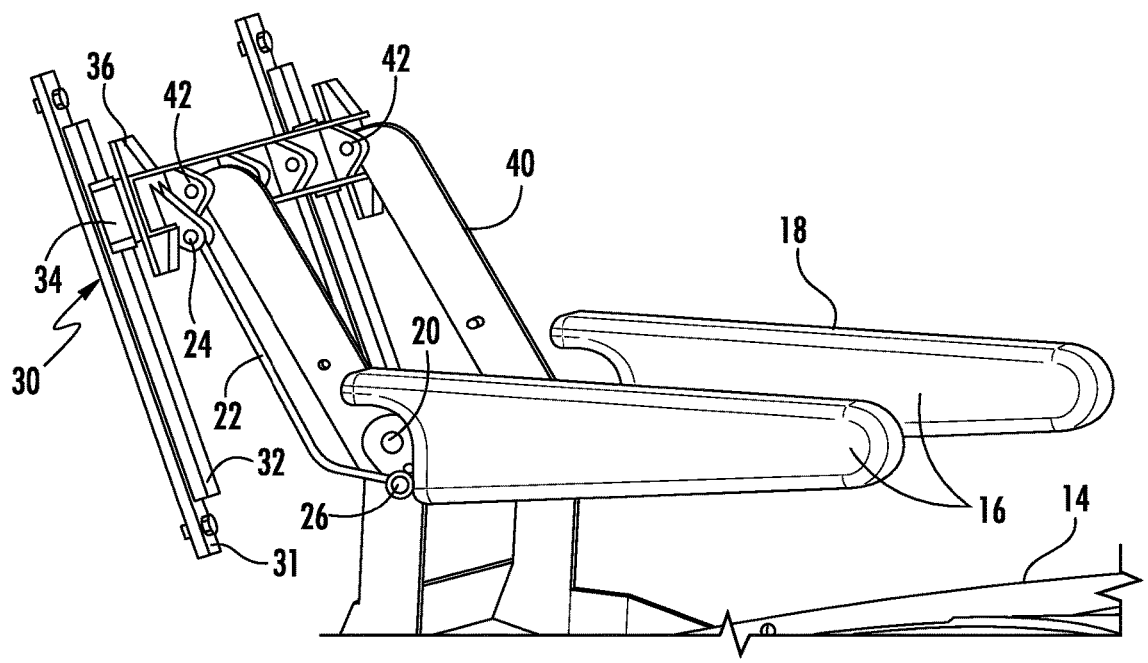
FIG. 3A is a perspective view showing the vehicle seat of FIG. 2, with some features omitted, in the full up position and showing the backrest and armrest linkage system.
Figure 3B:
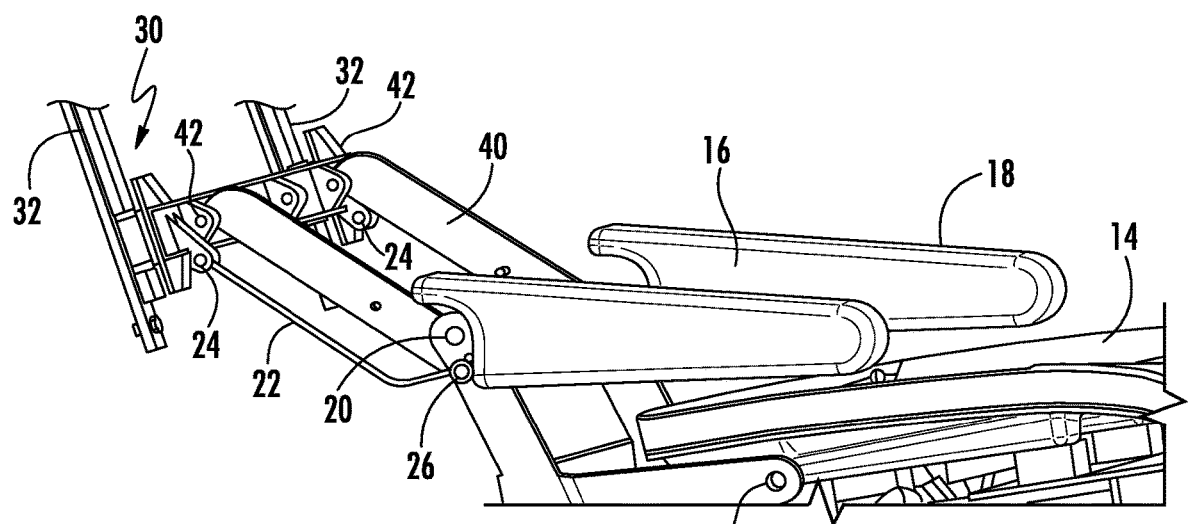
FIG. 3B is a perspective view showing the vehicle seat of FIG. 2, with some features omitted, in the full slouch position and showing the backrest and armrest linkage system.
Figure 4A:
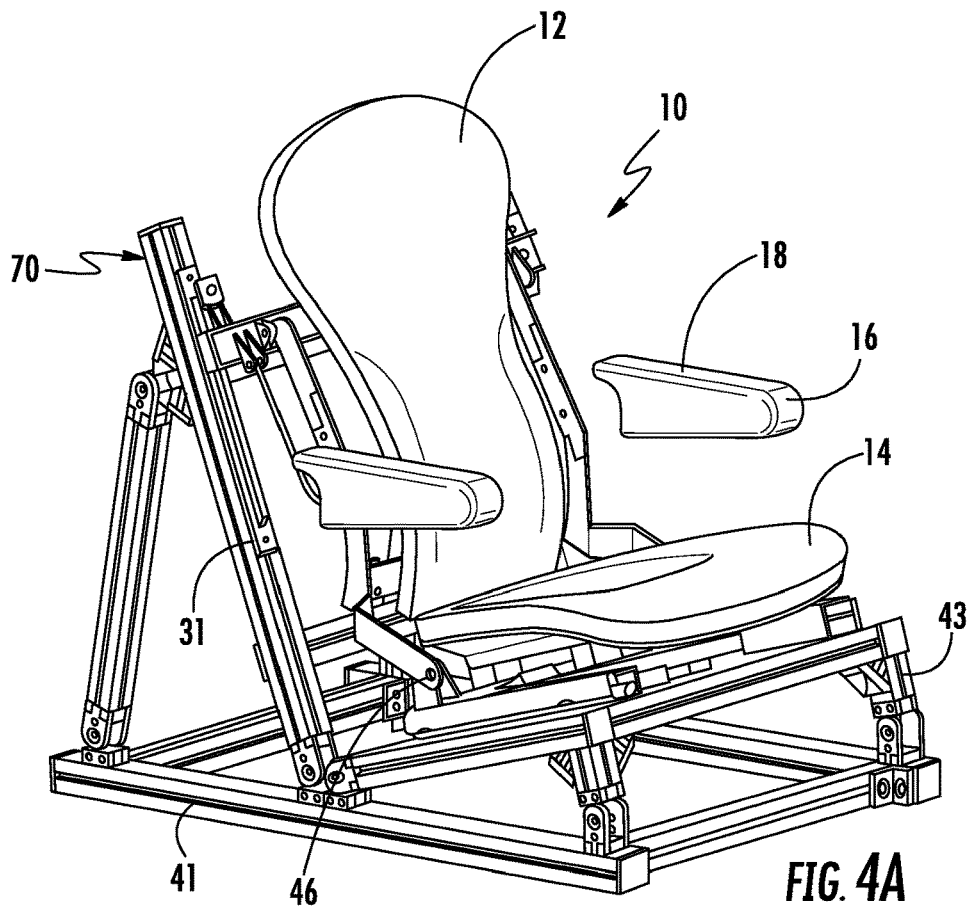
FIG. 4A is a perspective view showing the vehicle seat of FIG. 2 in the full up position, with the armrest pivot connection omitted.
Figure 4B:
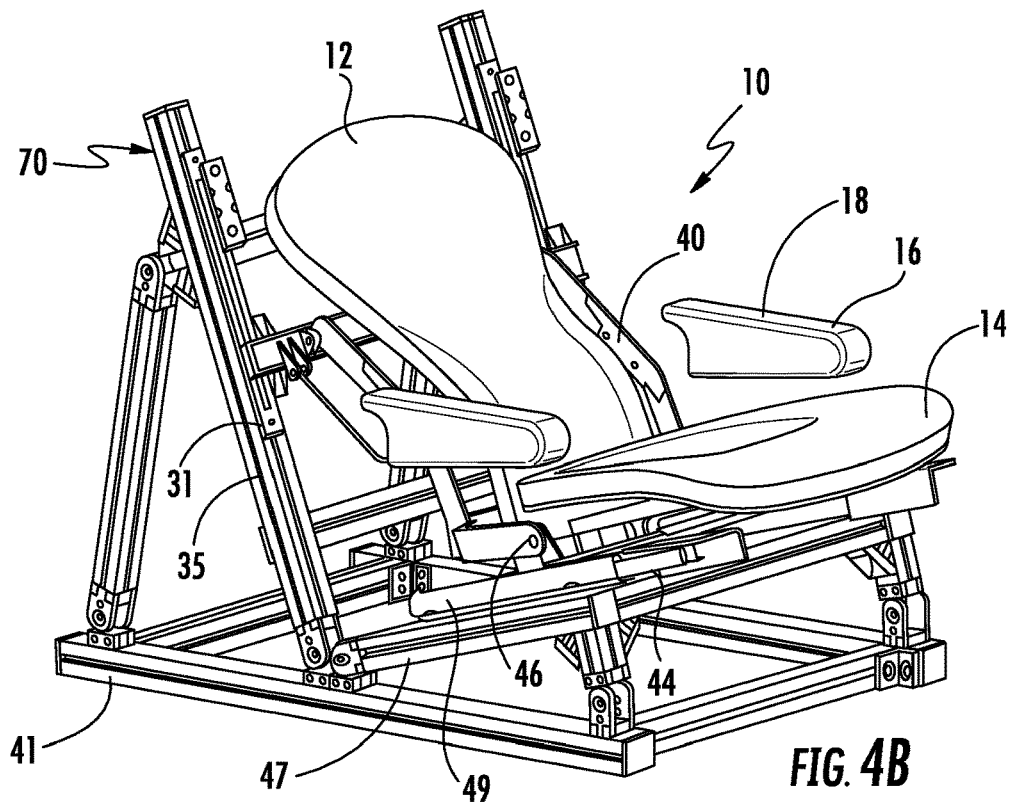
FIG. 4B is a perspective view showing the vehicle seat of FIG. 2 in the full slouch position, with the armrest pivot connection omitted.

As can be seen in FIG. 3A-3B, a frame 40 of the backrest 12 is connected to slide/armrest pivot connection 42. The slide/backrest pivot connection 42 is fixed on a slide support 36 and moves with the slider 34 between the full up position (FIG. 3A) and the full slouch position (FIG. 3B). The frame 40 and these connections are provided at each of the left and right armrest 16. Based on these connections a four bar linkage arrangement is provided at each side. The backrest frame 40, between the armrest/backrest pivot connection 20 and the slide/backrest pivot connection 42, the armrest 16, between the armrest/backrest pivot connection 20 and the link/armrest pivot connection 26, the link 22, between the link/armrest pivot connection 26 and the link/slide pivot connection 24 and the spacing between the link/slide pivot connection 24 and the slide/backrest pivot connection 42 form the four bar linkage (four link connection) at each side. Based on these four link connections, including the spacing between the pivot points, and the shape and length of the links, the inclination of surface 18 of armrest 16 can be preset for all positions of the slider 36 along guide rail 32, between the full up position (FIG. 3A) and the full slouch position (FIG. 3B). In the example shown, the inclination of surface 18 remains unchanged during the full-motion of the backrest frame 40. However, by changing the spacing between the pivot points, and the shape and length of the links, the shape of link 22 and/or the position of the pivots, other and different inclinations may be provided for the surface 18 of each armrest 16. For example, the backrest 12 may move between an angle of 19° (full up) to 56° (fully reclined) relative to vertical. Variations of this are possible, including a fully reclined position of even more than 90°. With changes in the inclination of the backrest 12, it may be advantageous to have the surface 18 of the armrest 16 change from −2° (full up position)—the wrist of the passenger is slightly below the elbow when resting on the armrest 16—to +6° (fully reclined position) relative to horizontal. In this situation the armrest 16 has an inclination surface 18 that changes from −2° to +6° as the backrest angle is changing e.g., from 19° to 56°. It should be apparent that many other relationships are possible wherein the armrest 16, which is pivotably connected to the backrest 12, has a change in the inclination of surface 18 which does not follow or match a change in inclination of the backrest 12. The four bar linkage (the armrest linkage system) may set the ratio of a change of angle of the armrest 16 to a change of angle of the backrest 12 over the course of backrest inclination change from full up to fully reclined position. The four bar linkage mechanism may also maintain the surface 18 of the armrest 16 in a position relative to the vehicle floor 5 and/or the seat base (seat support frame 47), such as in a horizontal position or a nearly horizontal position, over the course of backrest inclination change from full up to fully reclined position.

Figure 5A:
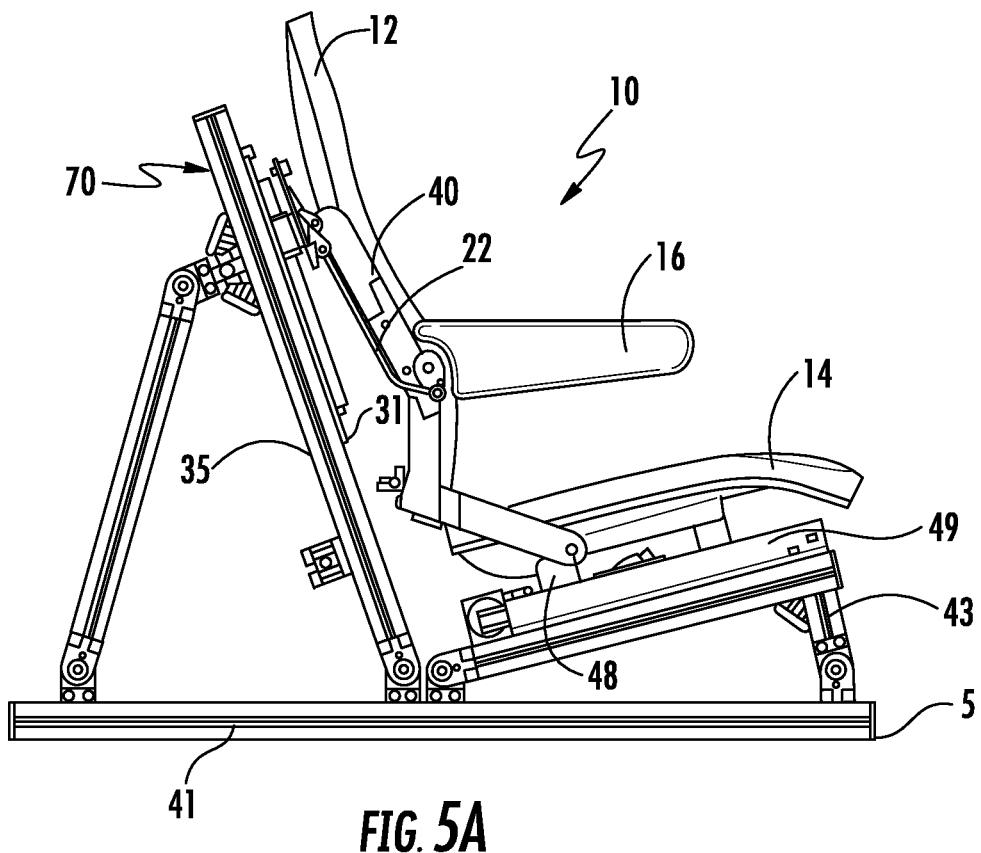
FIG. 5A is a side view showing the vehicle seat of FIG. 2 in the full up position, with the armrest pivot connection partially omitted.
Figure 5B:
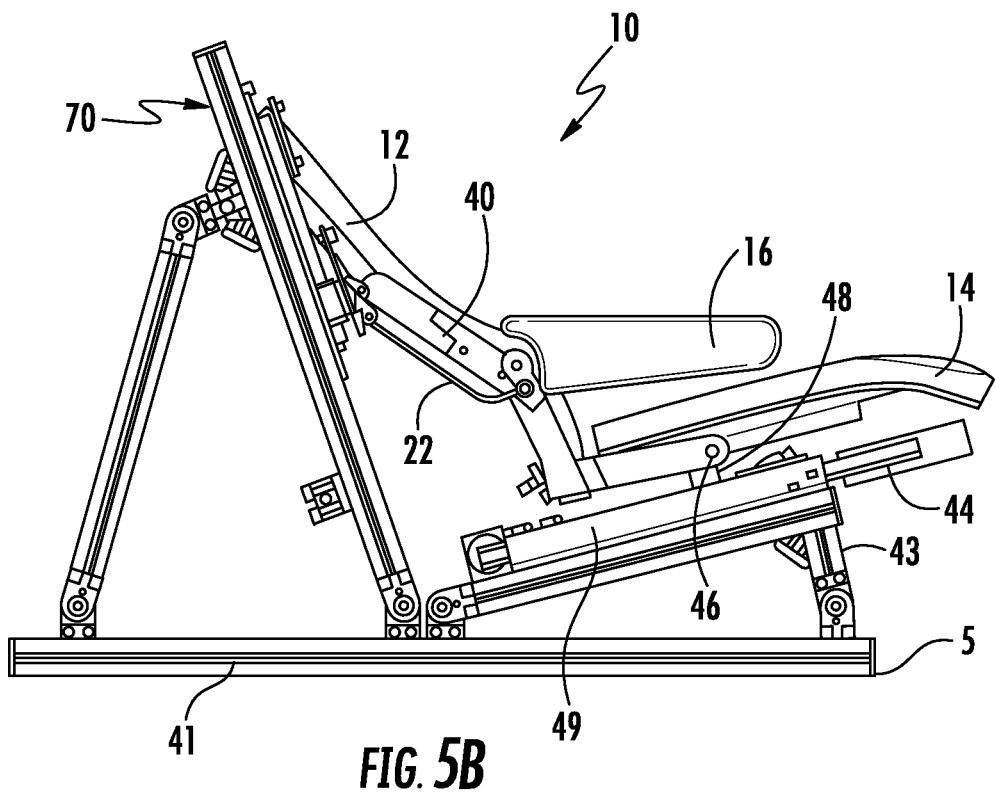
FIG. 5B is a side view showing the vehicle seat of FIG. 2 in the full slouch position, with the armrest pivot partially omitted.

As shown in FIGS. 4A-5B, the seat frame/backrest frame 70 of the vehicle seat 10 includes a backrest frame 35 to which the guide rail base 31 and guide rail 32 are connected. The seat frame/backrest frame 70 also includes a base 41 that is fixed to the vehicle floor 5 or is moveable forward and backward along rails along the vehicle floor 5. The frame 70 also includes a seat support frame 47 with seat support legs 43 connected to the base 41. The seat frame/backrest frame 70 may also have separate configurations, for each of the backrest 12 and the seat base 14, independently connected to the seat floor 5. The seat support frame 47 supports a seat track 49, which is mounted thereon. A seat slider (track follower) 44 is moveably mounted in the seat track 49. A seat/seat slider pivot support 48 is fixed to and supports the seat base 14 (FIGS. 5A and 5B). The seat/seat slider pivot support 48 is also connected to the seat slider 44. The seat/seat slider pivot support 48 has the pivot connection 46. The backrest frame 40 is pivotably connected to the seat base 14 at pivot connection 46. As can be appreciated considering the vehicle seat 10 in the full up position (FIGS. 4A and 5A) and the fully reclined position (FIGS. 4B and 5B), over the course of backrest inclination change from full up to fully reclined position, the seat base 14 slides forward as the seat/seat slider pivot support 48 and seat slider 44 move along the seat track 49.

Figure 6A:
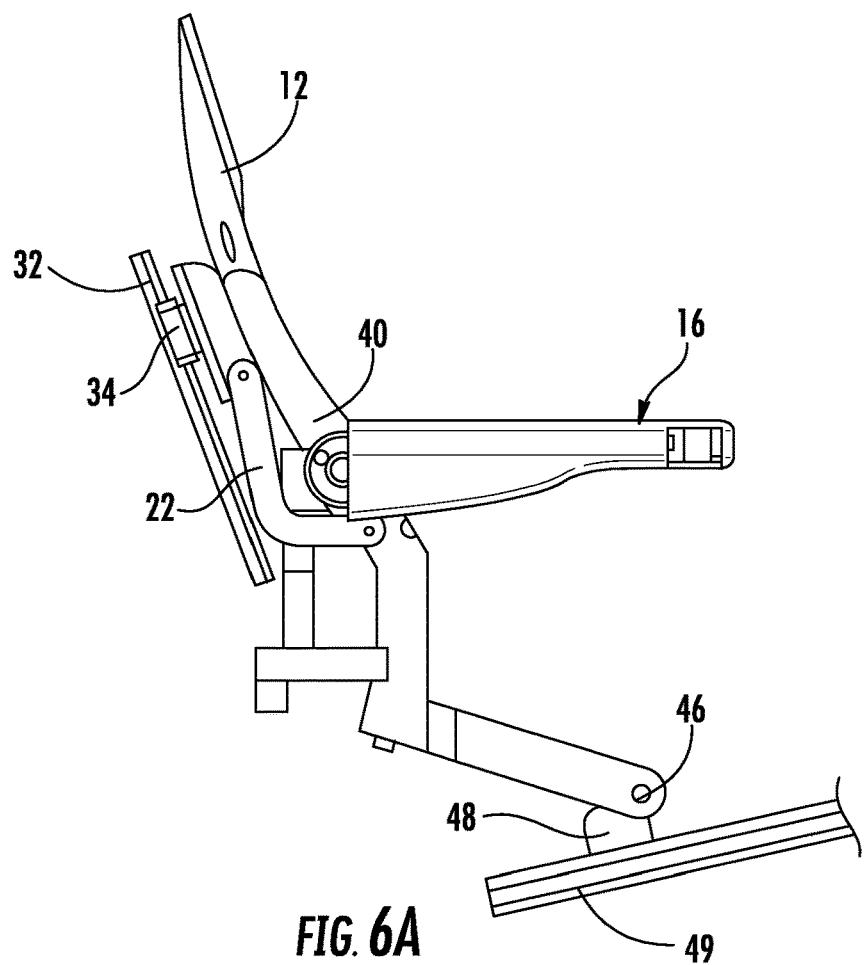
FIG. 6A is a side view showing a modified version of the vehicle seat of FIG. 2, with some features omitted, in the full up position with the armrest in a normal supported position.
Figure 6B:
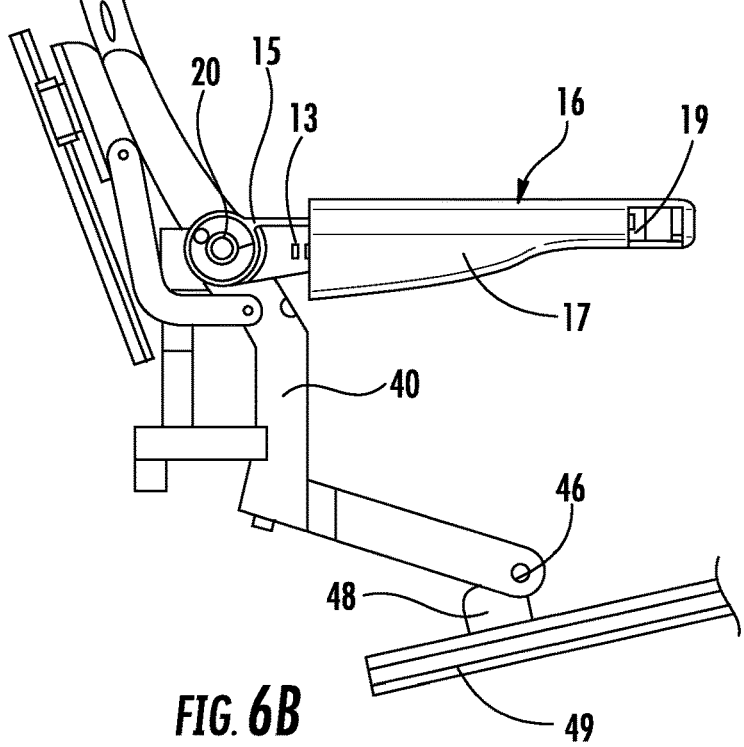
FIG. 6B is a side view showing the modified version of the vehicle seat of FIG. 2, with some features omitted, in the full up position with the armrest in an extended supported position.
Figure 7A:
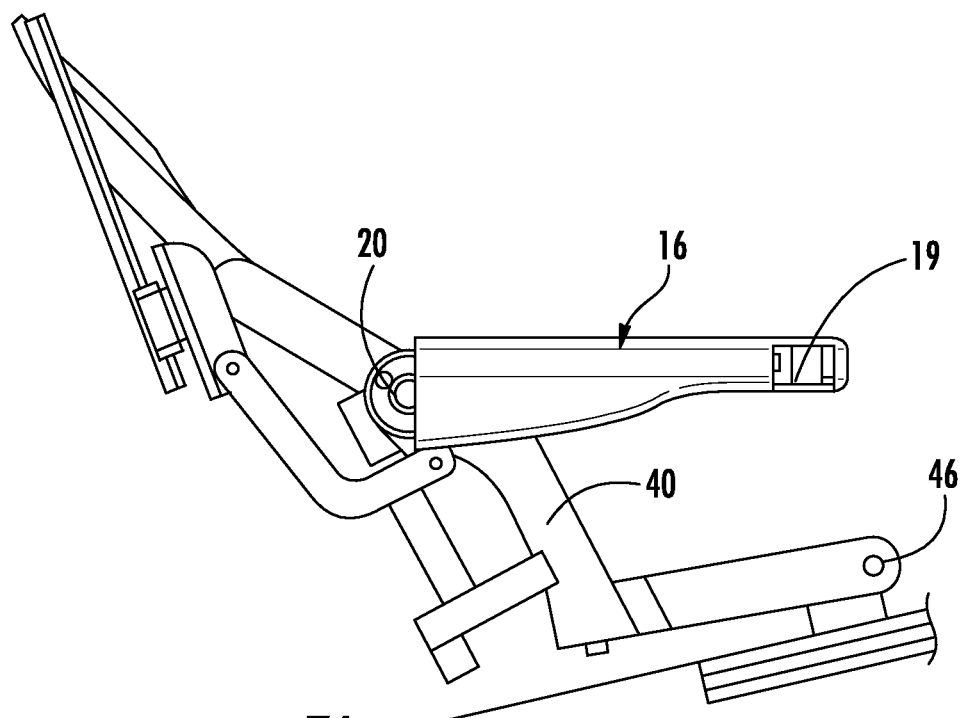
FIG. 7A is a side view showing the modified version of the vehicle seat of FIG. 2, with some features omitted, in the full slouch position with the armrest in a normal supported position.
Figure 7B:
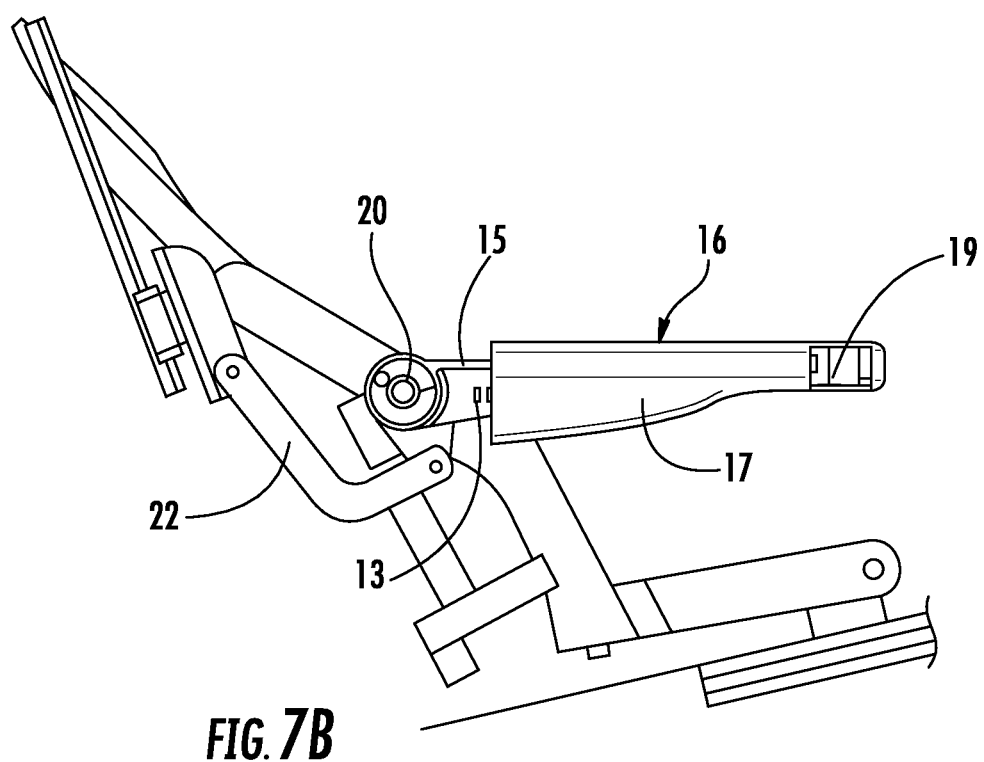
FIG. 7B is a side view showing the vehicle seat of FIG. 2, with some features omitted, in the full slouch position with the armrest in an extended supported position.

FIGS. 6A and 6B show a slightly modified embodiment with the armrest generally designated 16 connected to the backrest frame 40 at pivot 20. The backrest frame 40 is in the full up position. The armrest 16 is made so as to be extendable from a normal position as shown in FIG. 6A. The armrest 16 includes a support part 15 and a movable sleeve part 17. The movable sleeve part 17 is guided moveably along support part 15 between stop positions defined by openings 13. An actuator 19 is connected to a locking bar that is spring biased into a locking position—with the locking bar in one of the openings 13. The actuator 19 moves the locking bar from the opening 13, to allow movement of the sleeve part 17 relative to the support part 15. The construction allows the sleeve part 17 to be extended away from the pivot 20 to one of various positions as shown in FIG. 6B. FIGS. 7A and 7B show the backrest frame 40 in the full slouch position. In the full slouch position the sleeve part 17 can also move along the support part 15, between the stop positions such that sleeve part 17 moves from the normal position as shown in FIG. 7A to any one of various extended positions (spaced from the pivot 20) as shown in FIG. 7B.

Figure 8A:
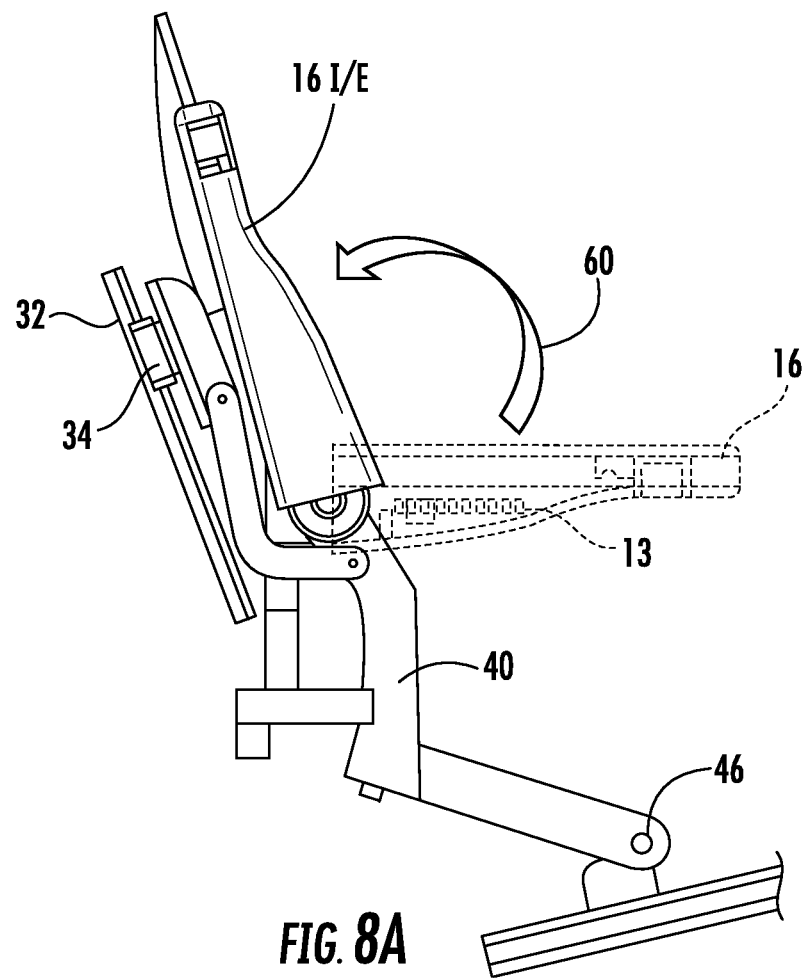
FIG. 8A is a side view showing the modified version of the vehicle seat of FIG. 2, with some features omitted, in the full up position with the armrest shown in a normal supported position in transparent/broken line and in an ingress/egress position in solid line.
Figure 8B:
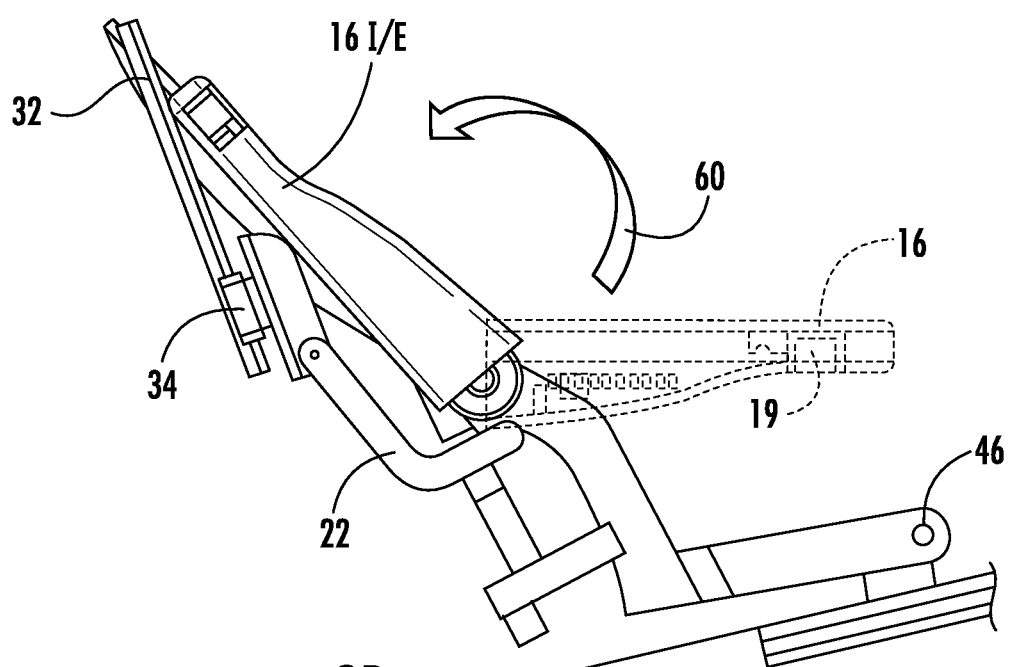
FIG. 8B is a side view showing the modified version of the vehicle seat of FIG. 2, with some features omitted, in the full slouch position with the armrest shown in a normal supported position in transparent/broken line and in an ingress/egress position in solid line.

FIGS. 8A and 8B show the armrest in both a supported position (shown to appear transparent—broken line) and a stowed or ingress/egress position, with the armrest designated 16 I/E. In the normal or use position, the armrest 16 is supported based on the armrest linkage system, which sets the position of the armrest 16 relative to the back rest 12. However, the armrest 16 is otherwise free to pivot upwardly. The backrest 12 is provided with a friction snap that receives the armrest 16 I/E in the ingress/egress position and locks the armrest 16 I/E in place, and out of the occupant's way, when not in use. This snap and locking feature also holds the armrest 16 I/E in the stored position during a dynamic event to prevent the armrest opening and injuring the occupant. The motion of the armrest 16 to the ingress/egress position I/E is possible in the full up position of the backrest 12 as shown in FIG. 8A, as well as with the backrest 12 in a full slouch position as shown in FIG. 8B as well as all positions between the full up position and the full slouch position.

The four bar linkage arrangement is one of several possible armrest linkage systems or armrest backrest angular position coordination systems that change an inclination of the armrest relative to the backrest upon changes in inclination of the backrest relative to the seat base, over a pivot range of motion of the backrest relative to the seat base. The change in inclination of the armrest relative to the backrest may maintain the armrest at an inclination relative to the seat base or vehicle floor. The change in inclination of the armrest may also be relative to the seat base or vehicle floor. Although such an armrest backrest angular position coordination systems is particularly useful for a slouch seat as described above, the armrest backrest angular position coordination systems may be advantageously used with other types of vehicle seats.

Figure 9:
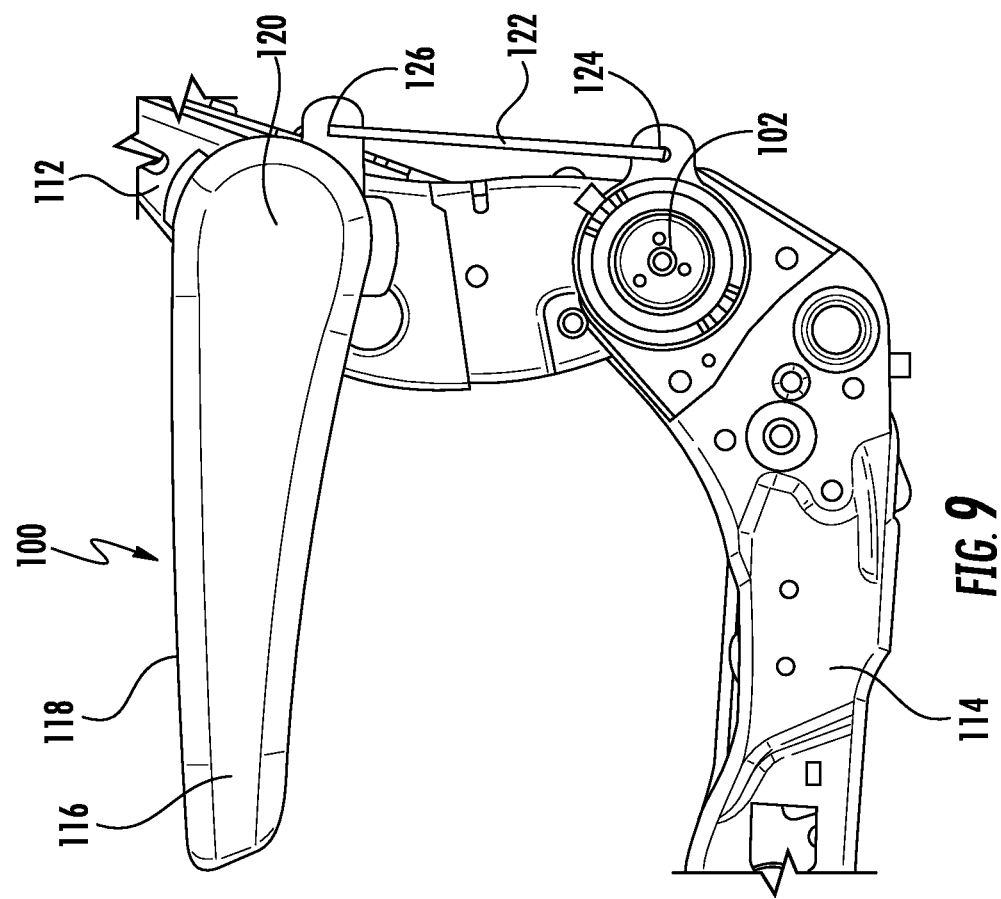
FIG. 9 is a partly schematic side view of a vehicle seat according to another embodiment of the invention.

FIG. 9 shows another embodiment of the invention comprising a vehicle seat 100 with a backrest frame 112 and a seat base frame 114. The seat base frame 114 is connected to the backrest frame 112 via a seat fitting 102. The seat fitting 102 allows the backrest frame 112 to pivot relative to the seat base frame 114 about an axis that passes through fitting 102. The fitting sets the angular inclination of the backrest frame 112 relative to the seat base frame 114. The left side fitting 102 that is shown in FIG. 9 cooperates with a similar right side fitting 102 (not shown). Each fitting may allow the backrest inclination adjustment and may also provide an easy entry feature for bringing the backrest fully forward (to a passenger pass through position). This easy entry feature may also include an interconnection with features to allow the seat base 114, carrying the backrest 112, to move forward, to allow easy entry of the passenger to gain access a region behind the vehicle seat 100.

The vehicle seat 100 includes an armrest backrest angular position coordination systems (armrest linkage system) with a link 122 connecting a link/seat base pivot connection 124, fixed to the seat base frame 114, to a link/armrest pivot connection 126 fixed to the armrest 116. The link/armrest pivot connection 126 is spaced from an armrest/backrest pivot connection 120. The backrest frame 112, between the armrest/backrest pivot connection 120 and the pivot of the fitting 102, the armrest, between the armrest/backrest pivot connection 120 and the link/armrest pivot connection 126, the link 122, between the link/armrest pivot connection 126 and the link/seat base pivot connection 124 and the seat base spacing between the link/slide pivot connection 124 and the pivot of the fitting 102 form a four bar linkage (a four link connection). Based on the (four link connection), including the spacing between the pivot points, and the shape and length of the links, the inclination of surface 118 of armrest 116 can be preset for all positions of the backrest frame 112 relative to the seat base frame 114. The four bar linkage may set the ratio of change of angle of the backrest 12 relative to change of angle of the armrest 16. The armrest linkage system (the four bar linkage mechanism) may set the ratio of a change of angle of inclination of the surface 118 of the armrest 116 to a change of angle of the backrest 112 over the course of backrest inclination change from full up to fully reclined position. The four bar linkage mechanism may also maintain the surface 118 of the armrest 16 in a position relative to the vehicle floor and/or the seat base, such as in a horizontal position or a nearly horizontal position, over the course of backrest inclination change from full up to fully reclined position.

Figure 10:
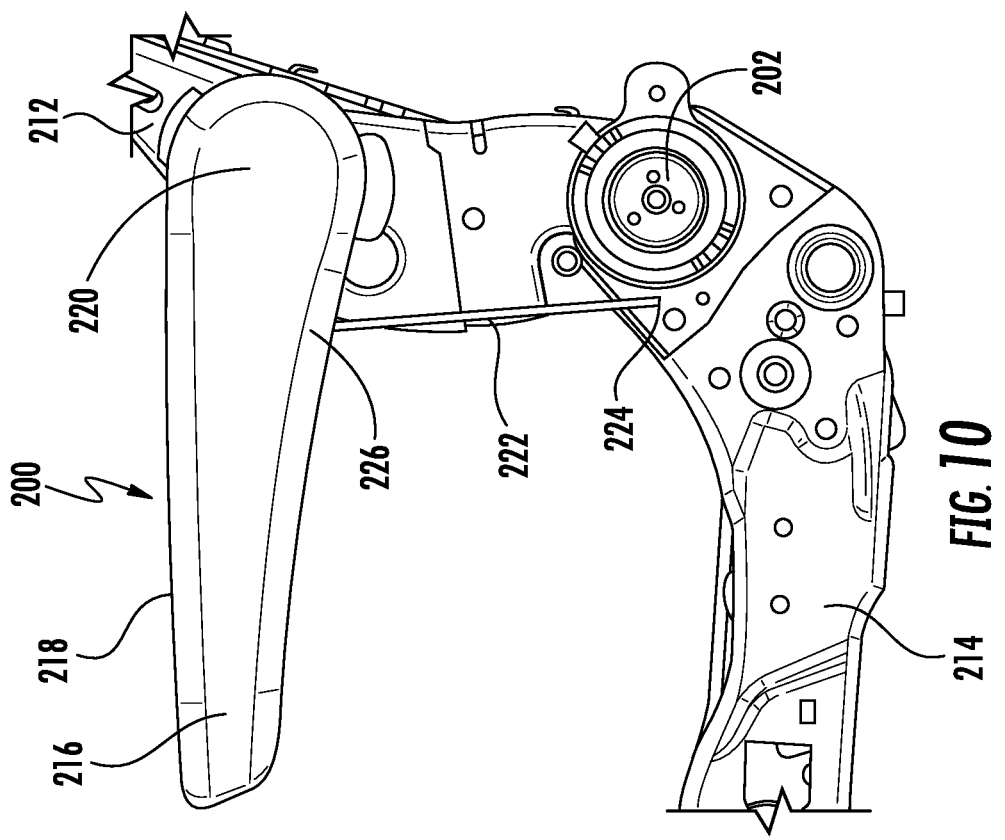
FIG. 10 is a partly schematic side view of a vehicle seat according to another embodiment of the invention.

The embodiment of FIG. 10 is similar to the embodiment of FIG. 9 except a link 222 is provided on a front side of the vehicle seat 200 whereas the link 122 is provided on a rear side of the vehicle seat 100. A seat base frame 214 is connected to a backrest frame 212 via a seat fitting 202, that allows the backrest frame 212 to pivot relative to the seat base frame 214 about an axis that passes through fitting 202, to set the angular inclination of the backrest frame 112 relative to the seat base frame 114. The left side fitting 202, that is shown in FIG. 10, may cooperate with a similar right side fitting (not shown). The fittings 202 at least provide a comfort adjust backrest setting, namely an adjustment of the inclination of the backrest 112 relative to the seat base frame 114 for different angular positions of the backrest 112 with a passenger seated in the vehicle seat 200.

The vehicle seat 200 includes an armrest linkage system with the link 222 connecting a link/seat base pivot connection 224, fixed to the seat base frame 214, to a link/armrest pivot connection 226, fixed to the armrest 216. The link/armrest pivot connection 226 is spaced from an armrest/backrest pivot connection 220. The backrest frame 212 between the armrest/backrest pivot connection 220 and the pivot of the fitting 202, the armrest 216 between the armrest/backrest pivot connection 220 and the link/armrest pivot connection 226, the link 222 between the link/armrest pivot connection 226 and the link/seat base pivot connection 224 and the spacing between the link/slide pivot connection 224 and the pivot of the fitting 202 form a four bar linkage (a four link connection). Based on the (four link connection, including the spacing between the pivot points, and the shape and length of the links, the inclination of surface 218 of armrest 216 can be preset for all positions of the backrest frame 212 relative to the seat base frame 214.

Figure 11:
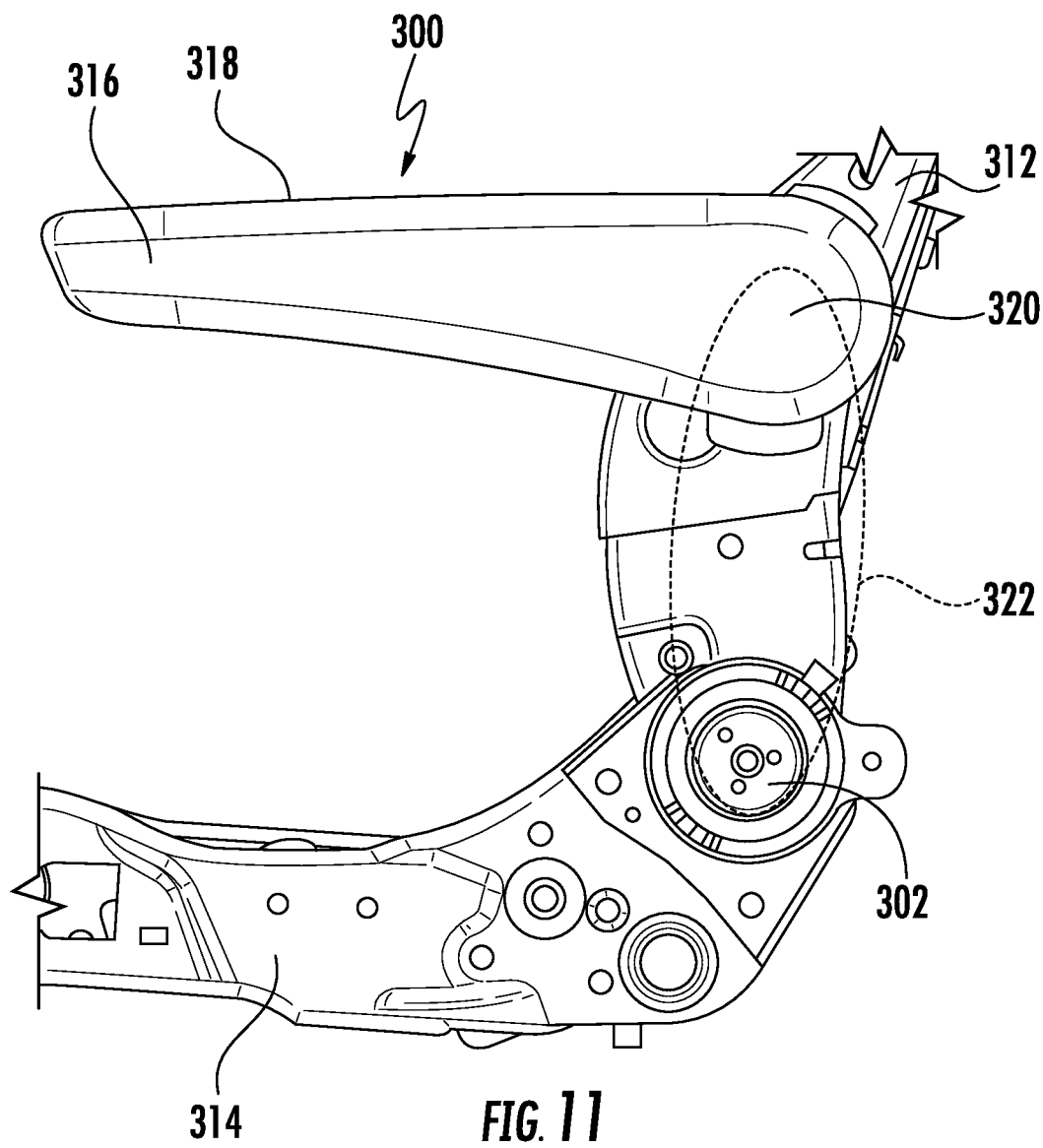
FIG. 11 is a partly schematic side view of a vehicle seat according to another embodiment of the invention.

FIG. 11 shows a vehicle seat 300 with a design similar to the vehicle seats of FIGS. 9 and 10. Vehicle seat 300 comprises a backrest frame 312 connected to a seat base frame 314 by a fitting 302. An armrest 316 is pivotably connected to the backrest 312 at armrest/backrest pivot connection 320. The seat fitting 302 at least allows the comfort adjustment of the backrest 312 relative to the seat base 314 between a fully upright position and a fully reclined position. The seat fitting 302 may be of the type that comprises a mechanism with the part that may be driven so as to be rotated in one direction (such as clockwise in FIG. 11) to lower (recline) a backrest 312 and may be rotated in the opposite direction (counterclockwise) to raise the backrest 312. Instead of a four bar linkage, the armrest linkage system or armrest backrest angular position coordination system includes a drive chain or cable 322 which connects the driven part of the fitting 302 to a driven connection of the armrest 316. By a configuration of the angular position coordination system 322, the upper surface 318 of the arm rest 316 may be maintained at the same inclination through the full range of movement of the backrest 312. Further, the coordination system 322 may be configured such that changes in an angle of the backrest 312, over the course of backrest inclination change from the full up position to the fully reclined position, result in different changes of an angle of inclination of the surface 318 of the armrest 316. For example, the upper surface 318 of the armrest 316 may have an inclination of −2° (relative to horizontal) in the backrest 312 full up position that changes to an inclination of +6° (relative to horizontal) in the backrest 312 fully reclined position, with the angle changing from −2° to +6° during the transition from full up position to fully reclined position of the backrest 412.

Figure 12:
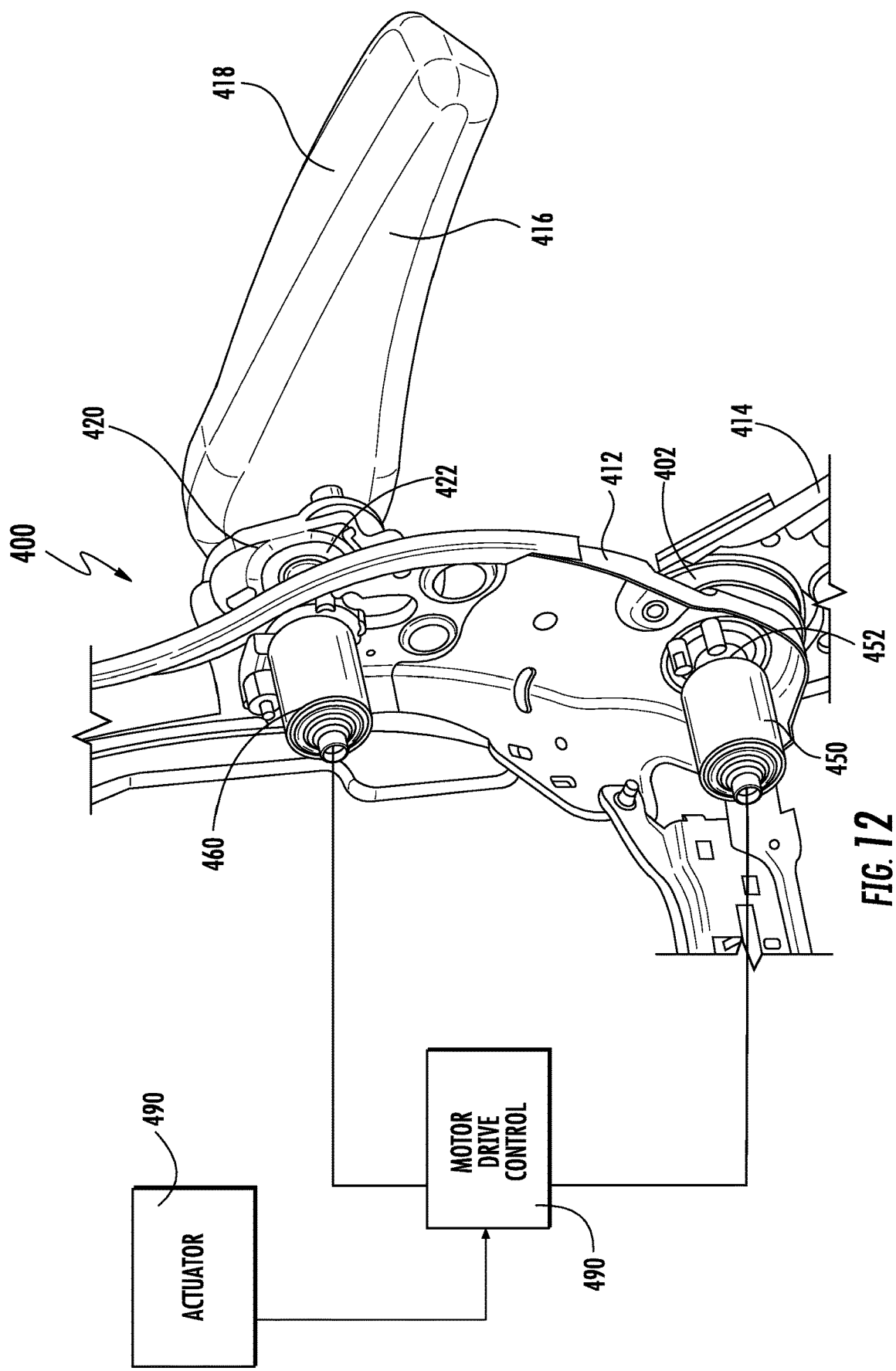
FIG. 12 is a partly schematic perspective view of a vehicle seat according to another embodiment of the invention.

FIG. 12 shows a vehicle seat 400 with a design similar to the vehicle seats of FIGS. 9, 10 and 11. The vehicle seat 400 comprises a backrest frame 412 connected to a seat base frame 414 by a fitting 402. An armrest 416 is pivotably connected to the backrest 412 at armrest/backrest pivot connection 420, that forms the armrest to vehicle support connection. The seat fitting 402 at least allows the comfort adjustment of the backrest 412 relative to the seat base 414 between a fully upright position and a fully reclined position. The seat fitting 402 may be of the type that comprises a mechanism with a driven part 452 that may be driven so as to be rotated in a first direction (such as counterclockwise as viewed in FIG. 12) to lower a backrest 412 and may be rotated in an opposite direction (clockwise) to raise the backrest 412.

A backrest/seat base pivot motor 450 is connected to a driven part 452 to drive the driven part 452 to lower a backrest 412 and to raise the backrest 412. A backrest/armrest pivot motor 460 is connected to a driven connection 422 of the armrest 316. A motor drive control 480 is connected to each of the backrest/seat base pivot motor 450 and the backrest/armrest pivot motor 460. An actuator interface 490 is connected to the motor drive control 480, allowing a passenger seated in the vehicle seat 400 to change the inclination of the backrest 412 between the fully upright and the fully reclined positions. The motor drive control 480 may be configured and/or the backrest/seat base pivot motor 450 and the backrest/armrest pivot motor 460 may be configured such that, the upper surface 418 of the arm rest 416 may be maintained at the same inclination through the full range of movement of the backrest 412. Further, these may be configured such that changes in an angle of the backrest 412, over the course of backrest inclination adjustment from full up to fully reclined position, result in different changes of an angle of inclination of the surface 318 of the armrest 316. For example, the upper surface 418 of the armrest 416 may have an inclination of −2° (relative to horizontal) in the backrest 412 full up position and an inclination of +6° (relative to horizontal) in the backrest 412 fully reclined position. The angle of inclination of the upper surface 418 of the armrest 416 changes from −2° to +6° during the transition from the full up position to fully reclined position of the backrest 412.

Any one of the embodiments, particularly the armrest and the associated armrest/backrest pivot connections 20, 120, 220, 320, 420 may cooperate with the backrest to provide a designed snap feature in the seat back. This feature receives the armrest and locks the armrest in place an out of the occupant's way when not in use. This snap/locking feature also holds the armrest in the stored position during a dynamic event to prevent the armrest opening and injuring the occupant.

The embodiments discussed above comprise an armrest to vehicle seat support connection that comprises an armrest to backrest pivot connection. The armrest to backrest pivot connection is provided between the armrest and the backrest to pivotably connect the armrest to the backrest. As an alternative, the armrest to vehicle seat support connection may comprise an armrest to seat base connection. The armrest to seat base connection is provided between the armrest pivot and the seat base or between the armrest and a frame of the seat base or another frame of the vehicle seat. In this case, although the inclination of the armrest relative to the backrest changes with changes in inclination of the backrest relative to the seat base, the armrest need not follow the travel path of the backrest.

Figure 13:
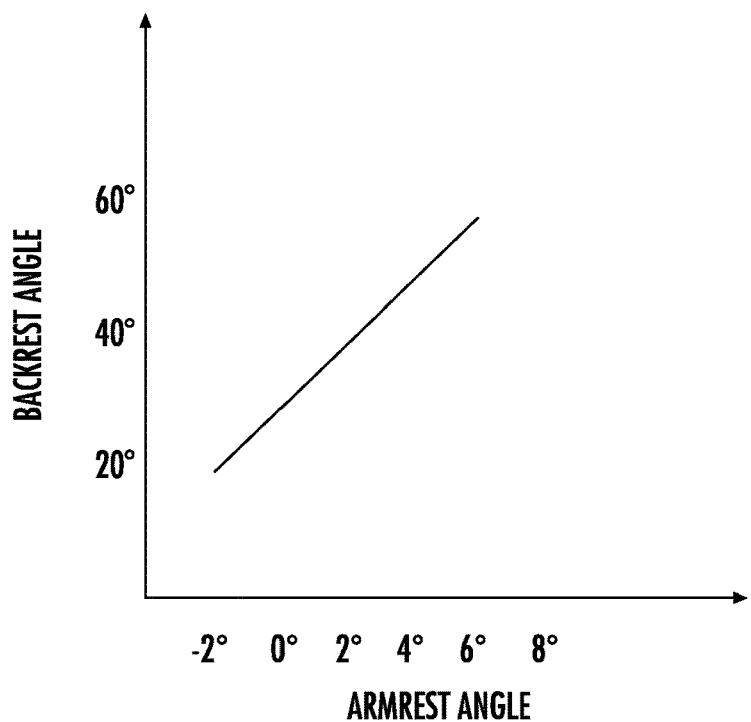
FIG. 13 is a graph showing a particular relationship between the angle of the backrest (relative to vertical) and the angle of the armrest (relative to horizontal)
Figure 14:
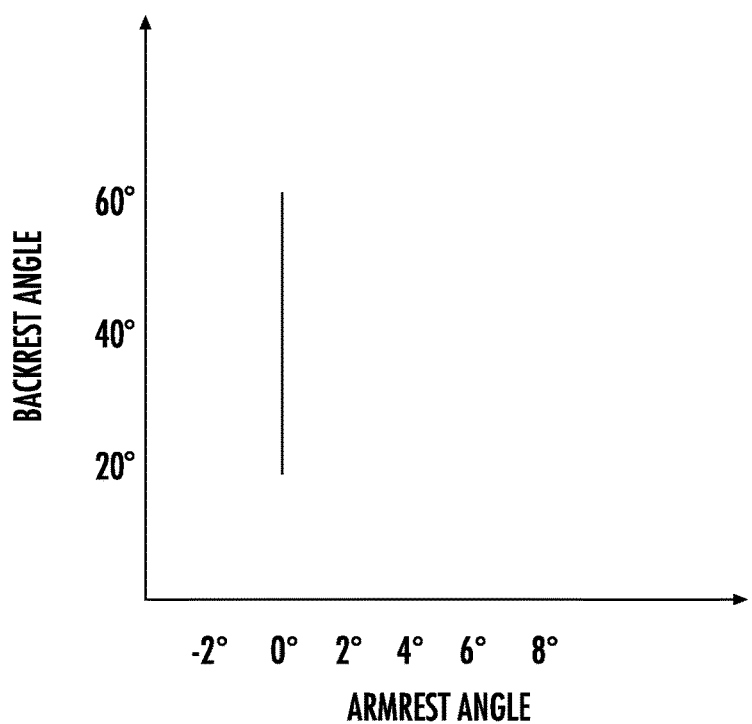
FIG. 14 is a graph showing another particular relationship between the angle of the backrest (relative to vertical) and the angle of the armrest (relative to horizontal)
Figure 15:
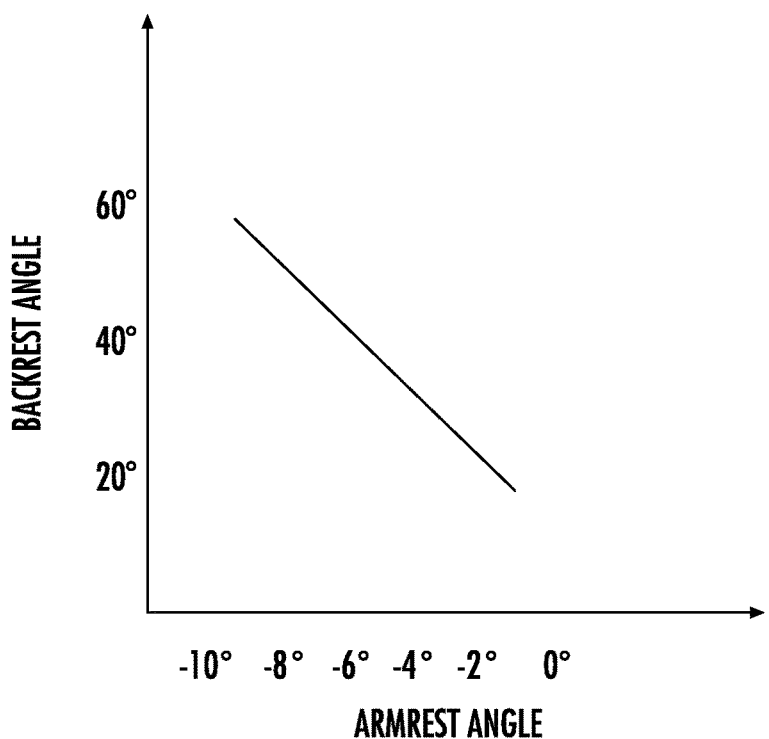
FIG. 15 is a graph showing another particular relationship between the angle of the backrest (relative to vertical) and the angle of the armrest (relative to horizontal)
Figure 16:
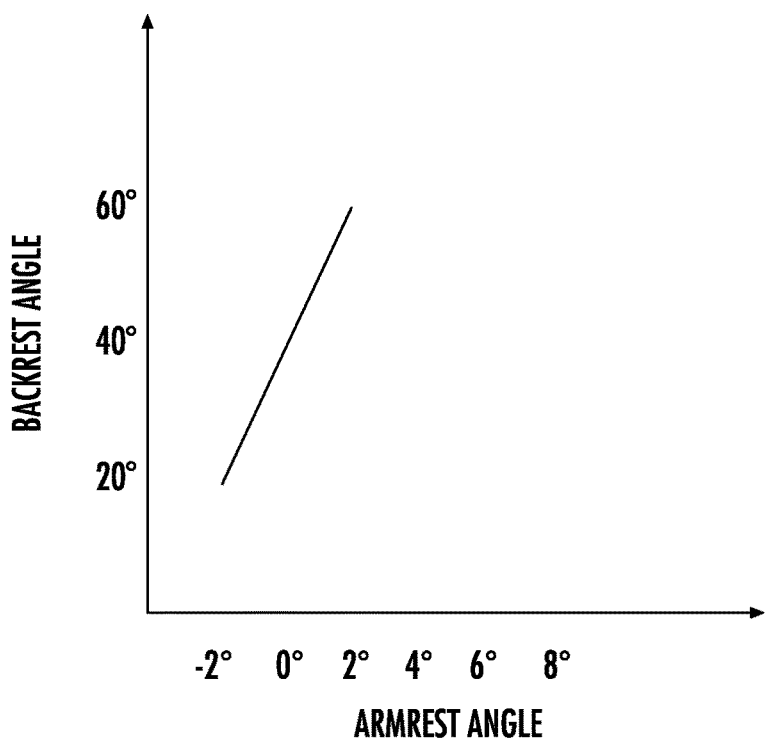
FIG. 16 is a graph showing another particular relationship between the angle of the backrest (relative to vertical) and the angle of the armrest (relative to horizontal).

FIGS. 13-16 graphically show particular relationships between the angle of the backrest (relative to vertical) and the angle of the armrest (relative to horizontal). FIG. 13 illustrates the mentioned relationship in which the armrest changes from −2° to +6° during the transition of the backrest from the full up position to fully reclined position, from 19° to 56° in this example. FIG. 14 illustrates the mentioned relationship in which armrest remains at a set angle and holds this angle as the seat reclines. The armrest changes angle relative to the backrest but is maintained at 0° (relative to horizontal) during the transition of the backrest from the full up position to fully reclined position, from 19° to 56° in this example. FIG. 15 shows an example in which the armrest angle (relative to horizontal) decreases—the front end/wrist end goes down relative to the elbow end—as the backrest reclines. This relationship may be set to be even more extreme such that the armrest is nearly at an angle of 180° relative to the backrest with the backrest in the reclined position. FIG. 16 shows a minor change in angle of the armrest as the backrest reclines. Other relationships, including nonlinear relationships, may be provided.

It should be appreciated that the relationship may be selected and set (preset) based on any of the embodiments, e.g., by selecting and setting the armrest linkage lengths, the pivot locations, etc. Further, according to the motor control embodiment of FIG. 12 the armrest linkage system 450, 460, 490 can allow the selection of any relationship between the angle of the backrest (relative to vertical) and the angle of the armrest (relative to horizontal). The embodiment of FIG. 12 provides particular advantages including the ability of the passenger to select, via actuator 490, between variations of the angle of the backrest 412 and the inclination of the armrest 416 such as maintaining the inclination of the armrest 416 through the full range of reclining movement of the backrest 416 or choosing from any of a number of predefined relationships between the inclination of the armrest 416 and the reclining movement of the backrest 416 (such as the predefined relationships illustrated with FIGS. 13-16). The passenger may also separately select, via actuator 490, the angle of the backrest 412 and the inclination of the armrest 416. The passenger may also set (in a memory associated with drive control 490), for later access, a user defined relationship between the change in inclination of the armrest 416 and the reclining movement of the backrest 416.

While specific embodiments of the invention have been shown and described in detail to illustrate the application of the principles of the invention, it will be understood that the invention may be embodied otherwise without departing from such principles.

LIST OF REFERENCE NUMBERS

5 vehicle floor
10 vehicle seat
12 backrest
14 seat base
13 openings
15 armrest support part
16 armrest
16 I/E armrest in the ingress/egress position I/E
17 armrest sleeve
18 armrest upper surface
18F armrest upper surface full up position
18S armrest upper surface full slouch position
19 locking bar actuator
20 armrest/backrest pivot connection
22 transmission link
24 link/slide pivot connection
26 link/armrest pivot connection
30 support connection
31 guide rail base
32 guide rail
34 slide
34F slide full up position
34S slide full slouch position
35 backrest frame
36 slide support
38 slide/link pivot support
40 backrest frame
42 slide/backrest pivot connection 42
43 seat support legs
44 seat slider (track follower)
46 backrest to seat pivot connection
47 seat support frame
48 seat/seat slider pivot support
49 seat track
70 seat frame/backrest frame or vehicle structure (bulkhead/wall)
100 vehicle seat
102 seat fitting
112 backrest frame
114 seat base frame
116 armrest
118 armrest upper surface
120 armrest/backrest pivot connection
122 transmission link
124 link/seat base
126 link/armrest pivot connection
200 vehicle seat
202 seat fitting
212 backrest frame
214 seat base frame
216 armrest
218 armrest upper surface
220 armrest/backrest pivot connection
222 transmission link
224 link/seat base pivot connection
226 link/armrest pivot connection 300 vehicle seat
302 seat fitting
312 backrest frame
314 seat base frame
316 armrest
318 armrest upper surface
320 armrest/backrest pivot connection
322 transmission chain/cable link
400 vehicle seat
402 seat fitting
412 backrest frame
414 seat base frame
416 armrest
418 armrest upper surface
420 armrest/backrest pivot connection
450 backrest/seat base pivot motor
460 backrest/armrest pivot motor
480 motor control
490 actuator interface

What is claimed is:

1. A vehicle seat comprising:
a seat base;
a backrest;
a base backrest pivot connection between the seat base and the backrest pivotably connecting the seat base to the backrest;
an armrest;
an armrest to vehicle seat support connection connecting the armrest to the vehicle seat; and
an armrest linkage system changing an inclination of the armrest relative to the backrest upon changes in inclination of the backrest relative to the seat base, over a pivot range of motion of the backrest relative to the seat base;
wherein said armrest linkage system comprises a link pivotably connected to the seat base at a link to seat base pivot connection and pivotably connected to the armrest at a link to armrest pivot connection,
wherein the link is disposed rearward of the backrest to seat base pivot connection and rearward of the armrest backrest pivot connection.

2. A vehicle seat according to claim 1, wherein the vehicle seat is a slouch seat and the seat base moves forward from a seat full-up position to a seat fully reclined position as the base backrest pivot connection moves forward from the seat full-up position to the fully reclined position and as the backrest changes in inclination relative to the seat base from a backrest full up position to a backrest fully reclined position.

3. A vehicle seat according to claim 2, further comprising a backrest slouch guide rail arrangement comprising a rail part and a slider connected to the rail to slide along the rail, the slider being pivotably connected to the backrest at a backrest slider pivot connection.

4. A vehicle seat according to claim 3, wherein:
the armrest linkage system comprises a link pivotably connected to the slider at a link to slider pivot connection and pivotably connected to the armrest at a link to armrest pivot connection;
the armrest to vehicle seat support connection comprises an armrest backrest pivot connection between the armrest and the backrest, the armrest backrest pivot connection pivotably connecting the armrest to the backrest; and
the link, from the link to slider pivot connection to the link to armrest pivot connection, the backrest, from the backrest to slider pivot connection to the armrest backrest pivot connection, the slider, from the backrest to slider pivot connection to the link to slider pivot connection and the armrest from the link to armrest pivot connection to the armrest backrest pivot connection form a four bar linkage changing an inclination of the armrest relative to the backrest upon changes in inclination of the backrest relative to the seat base.

5. A vehicle seat according to claim 1, wherein the base and backrest pivot connection, between the seat base and the backrest, comprises a fitting for pivoting of the backrest relative to the seat base, to change the backrest in inclination relative to the seat base between a backrest full up position and a backrest fully reclined position.

6. A vehicle seat according to claim 1, wherein:
the armrest to vehicle seat support connection comprises an armrest and backrest pivot connection comprised of a fitting between the armrest and the backrest, the fitting pivotably connecting the armrest to the backrest; and
the link, from the link to seat base pivot connection to the link to armrest pivot connection, the backrest, from the base backrest pivot connection to the armrest and backrest pivot connection, the seat base, from the backrest to seat base pivot connection to the link to seat base pivot connection and the armrest from the link to armrest pivot connection to the armrest and backrest pivot connection form a four bar linkage changing an inclination of the armrest relative to the backrest upon changes in inclination of the backrest relative to the seat base.

7. A vehicle seat according to claim 6, wherein: the link is disposed forward of the backrest to seat base pivot connection and forward of the armrest and backrest pivot connection.

8. A vehicle seat according to claim 6, wherein the armrest linkage system comprises a transmission chain or cable connecting a rotatable driven part of the fitting to a rotatable driven part connected to the armrest for changing an inclination of the armrest relative to the backrest upon changes in inclination of the backrest relative to the seat base.

9. A vehicle seat according to claim 6, wherein the armrest linkage system comprises: a backrest inclination motor connected to a rotatable driven part of the fitting;
an armrest inclination motor connected to a rotatable driven part connected to the armrest; and
a drive control controlling each of the backrest inclination motor and the armrest inclination motor for changing an inclination of the armrest relative to the backrest upon changes in inclination of the backrest relative to the seat base.

10. A vehicle seat according to claim 1, wherein the armrest to vehicle seat support connection comprises an armrest and backrest pivot connection between the armrest and the backrest, the armrest and backrest pivot connection pivotably connecting the armrest to the backrest.

11. A vehicle seat according to claim 1, wherein the armrest to vehicle seat support connection comprises an armrest to seat base connection, wherein the armrest to seat base connection is provided between the armrest and the seat base or between the armrest and a frame of the seat base.

* * * * *